United States Patent
Windley et al.

(10) Patent No.: US 9,652,206 B2
(45) Date of Patent: *May 16, 2017

(54) RULE ENGINE SYSTEM CONTROLLING DEVICES OF DISPARATE TYPES AND PROTOCOLS

(71) Applicant: Pico Labs, LLC, Lindon, UT (US)

(72) Inventors: Phillip J. Windley, Lindon, UT (US); Samuel Curren, Lehi, UT (US)

(73) Assignee: Pico Labs, LLC, Lindon, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,497

(22) Filed: Apr. 29, 2013

(65) Prior Publication Data

US 2014/0157244 A1   Jun. 5, 2014

Related U.S. Application Data

(63) Continuation of application No. 12/818,056, filed on Jun. 17, 2010, now Pat. No. 8,434,056.

(Continued)

(51) Int. Cl.
| | |
|---|---|
| G06F 9/44 | (2006.01) |
| G06F 9/45 | (2006.01) |
| G06F 9/54 | (2006.01) |

(52) U.S. Cl.
CPC ............... G06F 8/40 (2013.01); G06F 9/541 (2013.01); *G06F 8/20* (2013.01); *G06F 8/30* (2013.01); *G06F 8/36* (2013.01)

(58) Field of Classification Search
CPC ..... G06F 8/20; G06F 8/30; G06F 8/31; G06F 8/36; G06F 8/61; G06F 8/65; G06F 8/65
See application file for complete search history.

(56) References Cited

U.S. PATENT DOCUMENTS

| | | | |
|---|---|---|---|
| 7,603,358 B1 | 10/2009 | Anderson | |
| 7,698,405 B2 * | 4/2010 | Brown | H04L 12/24 709/202 |

(Continued)

OTHER PUBLICATIONS

Moshref et al., "Trumpet: Timely and Precise Triggers in Data Centers", ACM, SIGCOMM '16, Aug. 2016, pp. 129-143; <http://dl.acm.org/citation.cfm?id=2934879&CFID=742069323&CFTOKEN=86012495>.*

(Continued)

*Primary Examiner* — Thuy Dao
*Assistant Examiner* — Ben C Wang
(74) *Attorney, Agent, or Firm* — Justin K. Flanagan

(57) ABSTRACT

A rule engine system works with physical systems monitored by Internet-enabled endpoints on one hand and developer custom applications on the other. Endpoints operate in both the domain specific language of the rule engine, and communicate with participating applications in the native protocols thereof. Whether new or legacy, whether hardware, software, or firmware, whether having much, little, or no digital processing or communication capacity, the participating application may be monitored and controlled by an endpoint that communicates over the Internet with the rule engine. Individual developers prepare rule language files, containing data and instructions for the rule engine to implement through the end point. Any apparatus, whether exclusively mechanical, electrical, electronic, highly sophisticated electronic, or some combination may be monitored and controlled. Any participating application, from a mechanical lawn sprinkler to an Internet commerce server may be implemented thus.

16 Claims, 3 Drawing Sheets

Related U.S. Application Data

(60) Provisional application No. 61/187,968, filed on Jun. 17, 2009, provisional application No. 61/262,056, filed on Nov. 17, 2009.

(56) References Cited

U.S. PATENT DOCUMENTS

| | | | |
|---|---|---|---|
| 7,937,354 B2 | 5/2011 | Brelage | |
| 8,060,780 B2* | 11/2011 | Weber | G06F 17/3051 709/203 |
| 8,099,720 B2* | 1/2012 | Sedukhin et al. | 717/139 |
| 8,103,530 B2 | 1/2012 | Quiring | |
| 8,108,422 B2 | 1/2012 | Anderson | |
| 8,219,854 B2 | 7/2012 | Busayarat | |
| 8,341,598 B2* | 12/2012 | Peck et al. | 717/117 |
| 9,189,203 B1* | 11/2015 | Hadar | G06F 8/10 |
| 9,244,655 B1* | 1/2016 | Hadar | G06F 8/20 |
| 9,400,637 B1* | 7/2016 | Hadar | G06F 8/35 |
| 2005/0091640 A1* | 4/2005 | McCollum et al. | 717/117 |
| 2005/0246686 A1* | 11/2005 | Seshadri et al. | 717/117 |
| 2005/0289264 A1* | 12/2005 | Illowsky | G06F 1/3203 710/104 |
| 2006/0156054 A1* | 7/2006 | Brown | H04L 12/24 714/4.1 |
| 2006/0259604 A1* | 11/2006 | Kotchavi | H04L 41/0226 709/223 |
| 2008/0196002 A1* | 8/2008 | Koster | 717/106 |
| 2008/0222617 A1* | 9/2008 | Fernando et al. | 717/139 |
| 2008/0306986 A1 | 12/2008 | Doyle, Sr. | |
| 2009/0100165 A1* | 4/2009 | Wesley, Sr. | G06F 15/173 709/223 |
| 2009/0164499 A1* | 6/2009 | Samudrala | H04L 63/0263 |
| 2009/0165078 A1* | 6/2009 | Samudrala | G06F 21/604 726/1 |
| 2009/0187886 A1* | 7/2009 | Peck et al. | 717/117 |
| 2009/0276754 A1* | 11/2009 | Lind et al. | 717/106 |
| 2010/0088670 A1* | 4/2010 | Paster | 717/106 |
| 2010/0106546 A1* | 4/2010 | Sproule | 717/106 |
| 2010/0153482 A1* | 6/2010 | Kim | G06F 8/61 709/201 |
| 2010/0153778 A1* | 6/2010 | Weber | G06F 17/3051 714/16 |
| 2010/0223211 A1* | 9/2010 | Johnson et al. | 717/106 |
| 2010/0251252 A1* | 9/2010 | Laverone | G06F 9/5061 718/104 |
| 2010/0262560 A1 | 10/2010 | Murthy | |
| 2011/0106892 A1 | 5/2011 | Nelson | |
| 2011/0191460 A1* | 8/2011 | Sailhan | H04L 41/0893 709/224 |
| 2012/0136806 A1 | 5/2012 | Anderson | |
| 2012/0291008 A1* | 11/2012 | Bates et al. | 717/106 |
| 2014/0047439 A1* | 2/2014 | Levy | H04L 67/34 718/1 |
| 2014/0137071 A1* | 5/2014 | Wadhwani | G06F 11/3604 717/101 |
| 2016/0196131 A1* | 7/2016 | Searle | H04L 63/00 717/173 |
| 2016/0294605 A1* | 10/2016 | Searle | H04L 41/082 |
| 2016/0294614 A1* | 10/2016 | Searle | H04L 41/082 |

OTHER PUBLICATIONS

Bhargavi et al., "Dynamic Complex Event Processing—Adaptive Rule Engine", IEEE, Jul. 2013, pp. 189-194; <http://ieeexplore.ieee.org/stamp/stamp.jsp?tp=&arnumber=6844203>.*

Inzinger et al., "Generic Event-Based Monitoring and Adaptation Methodology for Heterogeneous Distributed Systems", John Wiley & Sons, Ltd., Jan. 2014, pp. 1-18; <http://onlinelibrary.wiley.com/doi/10.1002/spe.2254/abstract>.*

* cited by examiner

RULE ENGINE SYSTEM CONTROLLING DEVICES OF DISPARATE TYPES AND PROTOCOLS

RELATED APPLICATIONS

This application: is a continuation of co-pending U.S. patent application Ser. No. 12/818,056, filed Jun. 17, 2010, which claims the benefit of U.S. Provisional Patent Application Ser. No. 61/187,968, filed Jun. 17, 2009, and U.S. Provisional Patent Application Ser. No. 61/262,056, filed Nov. 17, 2009, all of which are incorporated herein by reference in their entirety.

BACKGROUND

The Field of the Invention

This invention relates to databases for storing information and executable applications and, more particularly, to novel systems and methods for providing individual control of information distribution and use by applications and databases operating over a network.

The Background Art

Much legacy equipment is decades old. Hardware may be mechanical, electrical, digital, or otherwise. A simple and cost-effective retrofit capability has heretofore been largely unavailable to implement automatic control, Internet enabled control, or the like for much of such legacy equipment. Moreover, even a device that is new may be completely mechanical and non-communicative. A method and apparatus are needed to implement such devices in systems where other devices are processor controlled over the Internet. A generalized, simple, reliable system and method of upgrading, automating, and networking such devices, by those unaffiliated with the original producer of such devices, is needed Likewise, the Internet makes information available. Some say too much information is available without adequate means to search and sort it out. Likewise, as information is collected, the people who own or control that information desire to know more about how to use the information, as well as collecting more of it. Meanwhile, much of that information trammels on individual privacy.

On the other hand, it would be an advance in the art to provide a system and method for collecting, integrating, and using information about a person, the physical world, the person's habits and wishes as well as location, activities, and the like, and relate that to marketing presentations. However, a secure system and method for serving and using such information, stripped of personal identification information, is needed, while yet permitting use of specific information identified with the individual but only known to the holder as an anonymous actor.

BRIEF SUMMARY OF THE INVENTION

In view of the foregoing, in accordance with the invention as embodied and broadly described herein, a method and apparatus are disclosed in one embodiment of the present invention as including a method for controlling a participating application may be based on facts corresponding to the entity controlling the participating application.

The Internet has historically been comprised of a large number of servers and a large number of clients, with clients requesting services or data from the servers. In the case of the world wide web, the servers provide web pages to the clients upon request. Those pages may contain a wide variety of functionality, but typically, clients are able to use only the services of one server at a time, and not mix the capabilities of different servers to accomplish something new.

Providers of servers may expose application programming interfaces (APIs) to their servers which allow access by other servers. In accordance with the inventions other servers may invoke functionality to create a combined service. Moreover, they are no longer limited by the fact that the client connects to one server at a time. That limitation on the possible functionality and the focus on the server rather than the client are removed. The client is usually operated by the end user, who may now make and implement decisions about the value of the services to which he or she is connecting. Additionally, the user is no longer forced to continue to interact with silos of functionality that don't take into account the user's individual context.

In accordance with the invention, the user is generating data that may be used to make the available services more intelligent. Thus a system in accordance with the invention makes use of that data and interact with the user in the environments in which the user resides, such as an internet browser, smart phone, other mobile device, or the like.

The architecture that makes such solutions possible may include a new architectural layer that spans the internet and enables the scripting thereof. It creates a system and method for developers to describe functionality and account for data in their applications that was not previously possible. A system and method in accordance with the invention may include a platform that allows disparate events from disparate systems to be evaluated in the context of the user (whether the user is a device, a machine, an entity, or even a person) and to deliver functionality to the user's client devices, correlated to those events and systems. The context of individuals can now be used as input for scripting the behavior applications or devices, and the correlation of that context across devices and data sets is also now possible.

The method may include providing an endpoint module, executing on a first processor operably connected to the Internet. A data system may be included, receiving general data and a rule engine executing on a second processor and comprising an interpreter effective to process a language. The language may be domain specific to the rule engine, executable exclusively by the rule engine, and may define a set of rules by which the rule engine evaluates requests received thereby.

The system may include identifying a participating application, characterized by a type and comprising operations, each characterized by some functionality thereof. Each may have its own participating protocol, native thereto and supporting communication therewith. One may operably connect the endpoint module to the participating application and the rule engine to the endpoint module.

The endpoint may communicate with the participating application in accordance with the native participating protocol. A developer may create and provide a file in the language, identifying salient events corresponding to activity of the participating application. Likewise, a developer's file may define conditions relating to control of the participating application. These may be based on facts corresponding to the entity owning or controlling the participating application.

Salient events may be identified by the rule engine from the KRL (Kynetx Rule Engine) file, and the rule engine may communicate this information to the end point. The end point monitors, and thereby detects and reports (or otherwise acts on) the occurrence, in the participating application, of at least one of the salient events. Reporting, by the end point to the rule engine is possible because both are Internet enabled. The participating application need not be.

Upon receiving, by the rule engine, the reporting from the endpoint module, the data reflecting the salient event, certain selected data may be selected out of the general data by the data system. This is in accordance with instructions from the rule engine and based on the content of the KRL file for that endpoint. The KRL file contains executables, programs if you will, written by a developer for the endpoint. Evaluation instructions are also found in the KRL file for controlling operation of the rule engine.

Receiving, by the rule engine, from the data system, the selected data from the general data, it evaluates a set of conditions reflecting the selected data. It also contains information representing at least one of a state of the participating application and values of parameters recognizable by the rule engine as relating to control of the participating application. Therefore, the rule engine may generate, based on the occurrence, directives corresponding to actions to be executed by the participating application.

The rule engine does not communicate directly with the participating application for a number of reasons. Instead, the rule engine sends instructions to the endpoint module to invoke the functionality of the participating application by way of directives to the end point module. The end point module then instructs, the participating application in the native protocol of the participating application.

All the participating application needs to be is a thing that can be monitored in some way. It simply needs to receive instructions in its native protocol, whatever that may be in mechanical, electrical, electronic, digital, chemical, pneumatic, fluidic, or other form. If it is processor based, it may know it is polled or otherwise monitored, but otherwise may be unaware it is being monitored.

The processes include creation of KRL application (a KRL file) by the developer. Installation of an end point in connection with the participating application may be by a user of the KRL application. Operation of the Kynetx™ rule engine (KRE) is by the owner or controller of the KRE system. Operation of the endpoint and participating application may or may not be by the same entity. The participating application will have an owner responsible for its operation. The monitoring thereof, and control thereof, by the endpoint may be done by a contractor or other agent, or may be by the owner of the participating application.

The system delivers to a user substantially the complete functionality of two systems, by late binding of two systems, under the control of the user, and without the participation of the developer of either of the two systems.

The system thus provides to the user a new, upgraded, computerized, and internet enabled control of the participating application. It does not require participation, knowledge, or consent of the developer of the participating application. Thus a post-production enablement of upgrading occurs at the behest of the owner or purchaser of the participating application. This upgrading of the process may occur years, even decades or more after initial installation. True retrofit and Internet enablement become available.

In one embodiment, an article of manufacture comprises a computer readable medium storing executable and non-executable data structures. The data structures may include an endpoint module, connected to the Internet and effecting communication between a rule engine and a participating application. The rule engine receives requests from the endpoint module, the requests each being encapsulated in an API call. Requests each contain data reflecting occurrence of a salient event corresponding to the participating application.

The rule engine is characterized by a language that is domain specific and defines a set of rules by which the rule engine evaluates the requests. The participating application is characterized by a type and includes participating executables, each of which may be characterized by its functionality. It does something.

The participating application may have its own protocol native to itself and of any variety. It may even be a non-communicative physical thing that is simply observed somehow by its endpoint, which can communicate. The endpoint module is programmed to communicate or otherwise interact with the participating application in the participating protocol thereof. Meanwhile, the rule engine is programmed to generate directives and send the directives to the end point module.

The directives are controlled by an evaluation occurring in the rule engine and effective to instruct the endpoint module to invoke the functionality of the participating application. The rules effectively constitute or include an interpreter to process the domain specific language, unique to the rule engine.

A developer may define every aspect of a KRL application (KRL file) desired. In proper syntax, a KRL file defines salience data for endpoints corresponding to participating applications, what events it "cares about." The KRL file defines code structures and contains individual rules, selected based on event criteria defined for each specific rule. The end point is provided ("knows") what is salient for its participating application, as told to it by the rule engine. The Participating App is simply monitored by or reports data to the end point, which then passes on the salient data to the rule engine.

In certain embodiments, the article's end point type may be selected from a network proxy server, a browser, an email server, an email client, a mobile platform, or the like. That type may typically be effective to process executable instructions. It may even include or be a telephony platform, or any special-function Internet-connected processor.

If the end point is a browser its type may be a browser extension, a combination of a browser extension with an information card selector, a book marklet effective to implement user originated, manual invocation of the rule engine, a site tag effective to invoke the rule engine directly and automatically from a web page, or the like.

The participating application may be configured to communicate with a plurality of endpoint types, a plurality of endpoint modules, or both. Each is connected to the Internet and characterized by at least one type of a plurality of types.

Salient events correspond to "data" processable for use in monitoring or controlling the participating application. Thus, the endpoint module is further programmed to request of the rule engine an identification of the salient events it should watch for, corresponding to the participating application. The endpoint is configured to communicate substantially exclusively with a specific type of participating application. Therefore, the protocol of the participating application may be a mechanical or electrical hardware configuration, a digital communication protocol, a software compatibility requirement, any means of rendering detectable a characteristic of the participating application, or any combination thereof.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
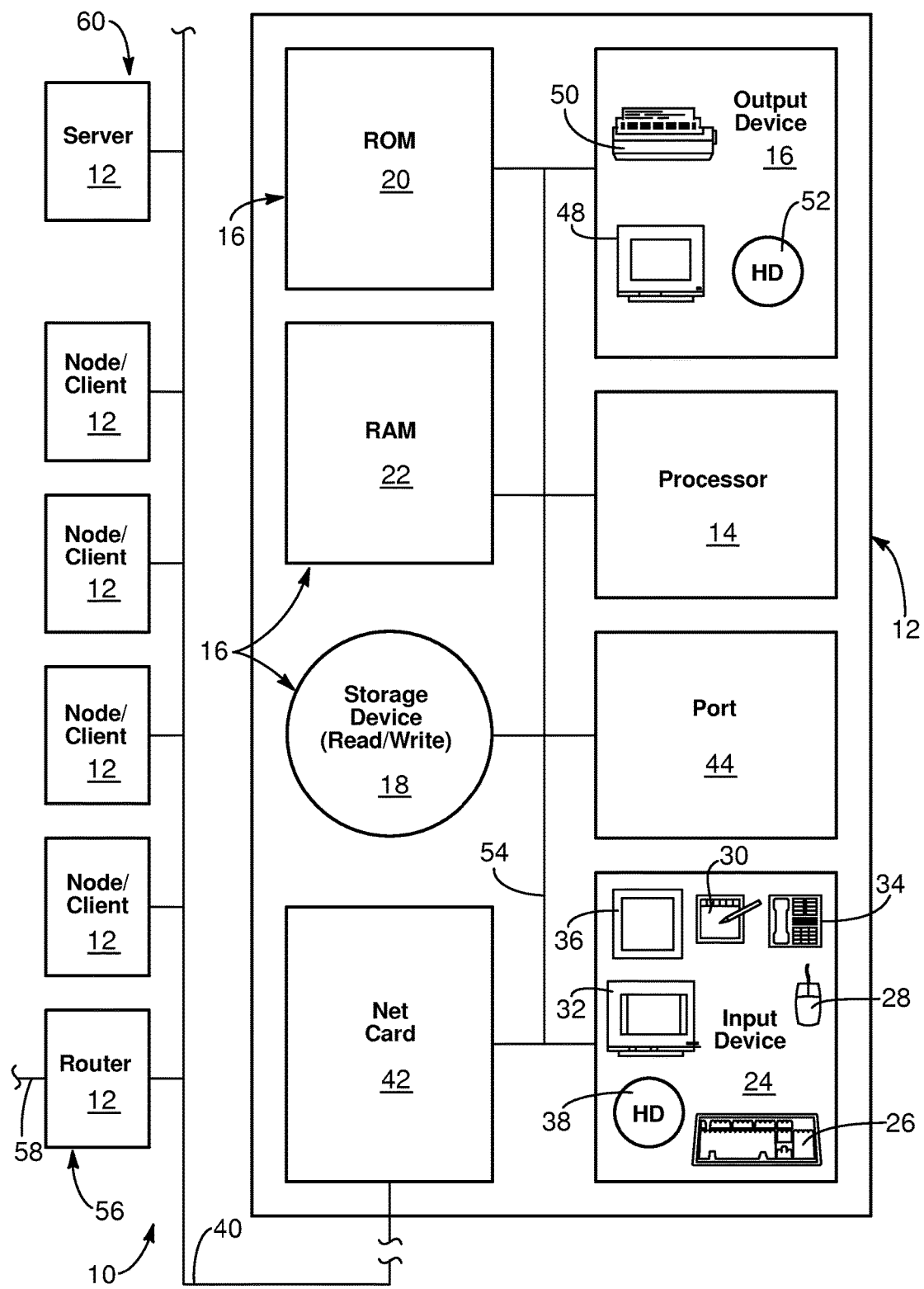
FIG. 1 is schematic block diagram of a hardware suite in accordance with the invention, showing details of optional features that may be relied upon in a computer, several such computers optionally networked together, and the network connected to an internetwork, such as the Internet during operation thereof.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, or other device may be used for outputting information as output devices 46.

Internally, a bus 54, or plurality of buses 54, may operably interconnect the processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 14 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
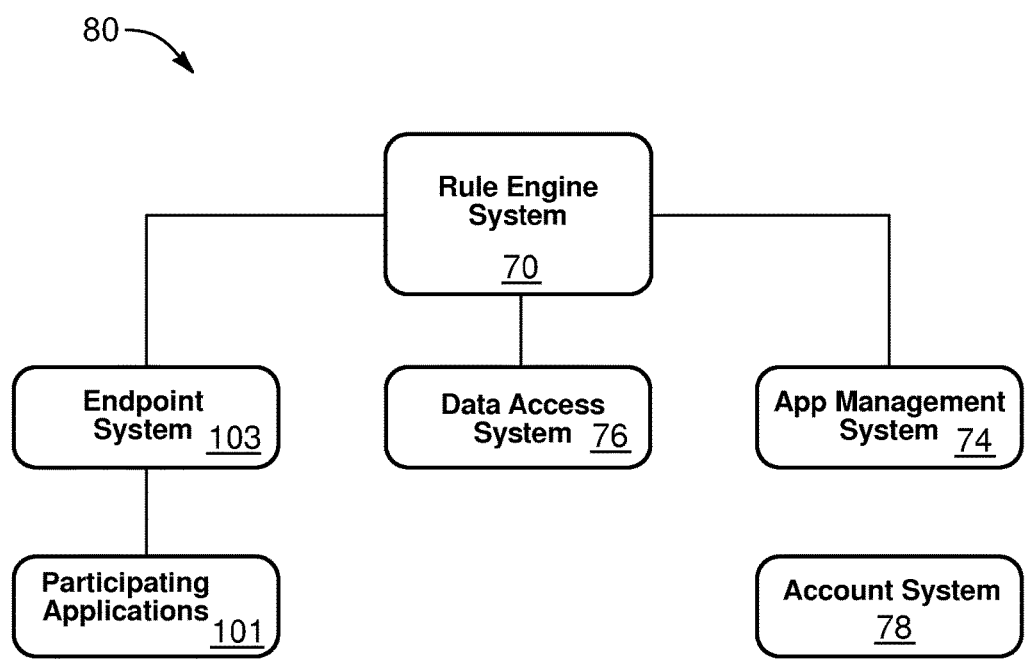
FIG. 2 is a schematic block diagram of a system of software and devices operable, in accordance with the invention, over the hardware suite of FIG. 1.

Referring to FIG. 2, a system 10 may host one or more executables. The system 70 may communicate with an application management system 74 by which developers create applications in the language, a domain specific language pertaining to the system 70. The system 70 may rely on a data access system 76 managing data stores pertinent to the applications originating from the application management system 74 and pertinent to the participating applications 101 and their respective endpoints 103. An account system may operate to verify authorizations and control access to data, applications, hardware, or all thereof.

The system 10, may include one or more processors connected to or over a network or the internet 58. The system 10 may host, for example, a rule engine system 70 communicating with participating applications 101 through endpoints 103. Endpoints 103 are Internet enabled and aware. Participating applications may or may not be, but are connected to be monitored by their respective endpoints 103.

Figure 3:
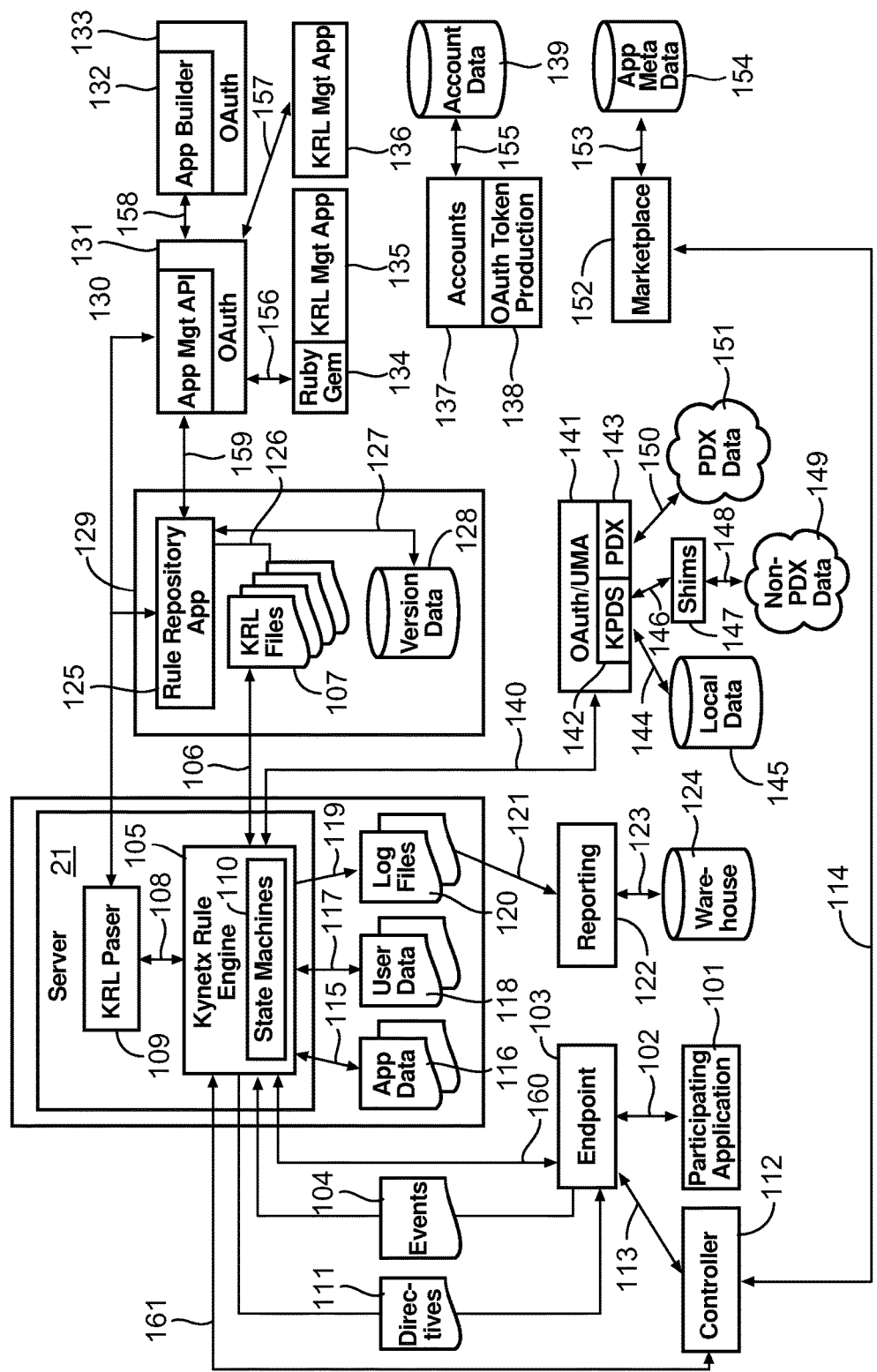
FIG. 3 is a schematic block diagram of the internal details of the system of FIG. 2 operating over the system of FIG. 1, in accordance with the invention.

Referring to FIG. 3, an apparatus 10 may host a Kynetx™ system 100 in which applications 101 may participate. One may refer to these applications 101 as such, as "apps" 101 or as Kynetx™ rule language files 107 or "KRL files" 107. Herein, a participating application 101 is in a form that it qualifies as a KRL file 107. Thus, such designations may be regarded as largely equivalent terms, since a participating application should typically be a KRL file 107 in current embodiments of apparatus and methods in accordance with the invention. Relaxing that requirement may be done but may lose many of the advantages of the system 70 in the process.

Typically, in a Kynetx™ rule engine system 70 or, simply, the rule engine system 70, the components and functions operable for a Kynetx™ Virtual Appliance (KVA) 72 to function are a Kynetx™ Rule Engine (KRE, or rule engine) 105, along with communications 108 between a KRE 105 and a parser 109, to parse Kynetx™ Rule Language files (KRL files) 107. KRL may also be thought of as Kynetx™ Rule Language files 107, characterized by the rules, protocols, formats and so forth of the KRE 105. A state machine 110 will typically be generated whenever a KRL file 107 is invoked.

Communications 115 will travel between the rule engine 105 and application data 116, while communications 117 travel between the rule engine 105 and user data 118. Meanwhile, communications 119 will pass between the rule engine 105 and the log files 120, along with communications 121 between the log files 120 and the reporting system 122. Communications 123 also pass between the reporting system 122 and the warehouse 124 storing data.

Likewise, the typical components and functions operating for a Kynetx™ Amazon Master Image (KAMI) 174 to function are a KRE 105, communications 108 between the KRE 105 and a KRL parser 109, and the state machine 10 generated upon invocation of a KRL 107, or log file 107.

A participating application 101 may be, and typically is, any internet-connected application, device, module, or routine participating in the Kynetx™ system 70 through connection to an endpoint 103. Participating applications 101 can be commercial, off-the-shelf (COTS) or custom-built applications 101 with integrated endpoints 103.

Communication 102 between the participating application 101 and the endpoint 103 may be in native language for each 101, 103. For example, if the participating application 101 is a browser, then the communication is done through Javascript. If the participating application 101 is a mail server, then the communication is SMTP/IMAP (Simple Mail Transfer Protocol/Internet Message Access Protocol). For IP-based telephony systems, the communication may be SIP (Session Initiation Protocol), and so forth.

The endpoint 103 is a program or application designed specifically as an intermediary for a specific type of participating application 101. The endpoint 103 is executable to register itself with the Kynetx™ Rules Engine 105 and receives instructions that govern its behavior. The endpoint 103 also watches for "salient" events 104 occurring in or on the participating application 101, and generates calls to the Kynetx™ Rules Engine 105, passing events 104 to the Kynetx™ Rules Engine 105 to be evaluated thereby.

The KRE 105 functions in response to the Kynetx™ Rule Language (KRL) as found in KRL files 107. The endpoint 103 receives directives 111 from the Kynetx™ Rules Engine 105, which instruct it what to tell the participating application 101 in order to execute the instructions encountered in the KRL applications encapsulated within the KRL Files 107. The endpoint 103 also interacts with a controller 112 responsible to manage the user's experience across multiple endpoints 103 with multiple participating applications 101. Endpoints 103 are typically attached to participating applications 101 either through user opt-in processes (e.g., downloads) or through an initial system configuration. The endpoint 103 thus becomes the interface between the participating application 101 and the Kynetx™ Rules Engine 105.

Events 104 are the occurrences (events 104) occurring in or on the participating application 101 that the endpoint 103 identifies as being of particular significance to (salient to) the associated KRL applications 107. The endpoint 103 is responsible for observing salient events 104 and passing them on to the Kynetx™ Rules Engine 105.

The Kynetx™ Rule Engine 105 may be considered in many respects to be a central heart of the Kynetx™ system 70. It is the component 105 that evaluates KRL applications 107 encapsulated in KRL files 107, communicates 160 with endpoints 103, communicates 161 with controllers 112, and generates and stores data as application data 116 or "app data" 116, user data 118, and log files 120. The KRE 105 validates KRL applications by invoking the KRL parser 109, and manages internal state machines 110. It 105 is responsible to, interact with KPDS 142 and PDX 143 to retrieve data for evaluation. The KRE 105 is hosted in a server 12, in the illustrated embodiment, an Apache server 21.

Many Kynetx Rule Engines 105 may be operating within a single Kynetx™ system 70. The number of Kynetx™ Rule Engines 105 is determined by the load placed on the system 70. The Kynetx™ Rule Engine 105 specifically executes KRL applications 107, and understands KRL natively. Thus the KRE 105 provides the facility that makes the abstractions in KRL possible. It also connects to and utilizes data sources such as Geo-IP mappings, census data, weather data, and sources for core KRL functionality. The Kynetx™ Rule Engine operates memcached technology and manages caching for datasets and KRL applications 107.

Communication 106 between the Kynetx™ Rule Engine 105 and the KRL files 107 relies on the KRE 105 to connect to the rule repository 125 to retrieve or pull rules in at runtime. The KRE 105 may use the application programming interface (API) 130 or other API provided by the rule repository 125. The Kynetx™ Rule Engine 105 caches KRL files 107 until the cache is reset by the rule repository when a new production version of a KRL file is created.

KRL files 107, as Kynetx™ rule language files 107 encapsulate executable code constituting Kynetx-rule-language-based applications. These files 107 may be generated by developers using any number of different tools available and currently deployed to the Kynetx™ system 70 through the application management API 130.

Communication 108 between the Kynetx™ Rule Engine 105 and the KRL Parser 109 occurs when the KRE 105 is ready to evaluate a KRL file 107 that it does not have cached. The KRE 105 may have many KRL files 107 readily available in one or more caches available to it at various levels of proximity. The KRL parser 109 checks the validity of the KRL files 107, usually returning either a pass or fail designation. The KRE 105 passes the entire KRL file 107 to the parser 109, which then parses the file 107 and returns a result back to the KRE 105, indicating whether the KRL File 107 is correct. If malformed by content, context, syntax, or other detectable error, the KRE 105 may identify the fact that the file 107 is non-functional or may additionally characterize the error or failing of the file 107.

State machines 110 are generated by the KRE 105 whenever a KRL file 107 is invoked. State machines 110 are actually user specific and track their associated user's progress through out the application 107 as endpoints 103 pass salient events 104 back to the KRE 105. State machines 110 that have reached completion (their pre-defined, completed state) trigger further evaluation in the KRE 105 of the KRL file 107. They also typically trigger evaluation of other conditions of interest to the user through the application 107, and may be programmed to trigger one or more actions being transmitted, by directives 111, back to the endpoint 103.

Directives 111 are the instructions sent from the KRE 105 to the endpoint 103 when a KRL file 107 is evaluated and all conditions are met for an action to be executed. Formats of directives 111 may typically be made specific to the type of endpoint 103 to which directed. Likewise, directives 111 may be formatted in a default JSON structure.

The controller 112 is a user-specific application that interacts with all of the endpoints 103 deployed in the behalf of a specific user. The controller 112 provides direction to the different endpoints 103 on action execution and data source management. The user can see all of the applications and endpoints 103 installed for that user. The controller 112 also communicates with the application marketplace module 152, which may be shortened to marketplace 152 or application marketplace 152, which will determine which applications a user has access to.

Communication 113 between the endpoint 103 and the controller 112 often involves the controller communicating parameters to the endpoints 103, such as those indicating which applications are active for the user. Meanwhile, communications 14 between the controller 112 and the marketplace 152. The controller 112 communicates with the marketplace 152 to determine application ownership for individual users. Likewise, communication 114 between the KRE 105 and application data 116 involves the KRE 105 generating data associated with each application at runtime. The KRE 105 writes that data out to disk 18, or some other memory device 16 on a server 21. The application data 116 is specific to an individual KRL file 126 or application, typically embedded therein.

Communication 117 between the KRE 105 and the user data 118 results from the KRE 105 generating data associated with each user at application runtime and writing that data out to disk 18 or a memory device associated with (typically regarded as "on") a server 21, such as an Apache server 21. The user data 118 is specific to individual users for individual KRL files 107 or applications. Communication 119 between the KRE 105 and the log files 120, generated by the KRE 105 to document the execution of KRL files 107 by the KRE 105, are thereby written out to memory 16, such as to disk 18, on the server 21. Log files 120 contain records for each individual evaluation of a KRL file 107 by the KRE 105, whether or not any action is taken by the application 107 embedded in the KRL file 107.

Communication 121 between the log files 120 and the reporting system 122 occurs because the reporting system has ETL processes connecting to the log files on the server 21 hosting the KRE 105. These ETL processes remove log files 120 for the KRE 105 as they are processed thereby. The reporting system 122 is comprised of ETL processes and applications that process log files and store the data in a warehouse 124, actually a data warehouse 124 (e.g., a memory device 16 associated with a database engine). The reporting system 122 can output data to other systems or generate reports for human consumption.

Communication 123 between the reporting system 122 and the warehouse 124 may result from the reporting system 122 connecting to the warehouse 124 using database access technologies to store, retrieve, and modify data stored in records in the warehouse 124. The data warehouse 124 stores reporting data from the operation of the system 70, centered around the KRE 105.

A ruleset manager 125, or rule repository application 125 (shorthanded as repository 125) is responsible for managing KRL files 107 submitted to the platform 70 or system 70 through the application management, application programming interface (API) 130. Thus, the repository 125 stores KRL files 107 on disk as records 107 or files in memory 16, and manages a database for application version data 128 control, updating, verification, or all thereof. Storage 126 of KRL files 107 occurs whenever the rule repository application 125 writes the KRL files 107 out to disk 18.

The communication 127 between the rule repository application 125 and the version database 128 originates with the rule repository application 125 connecting to the version database 128 to store version information corresponding to KRL files 107. The version database 128 stores that version information for all the KRL files 107 recognized by the system 70. It reflects which version of a particular application is "production," and which versions may exist that are not "production" qualified. The data in this database 128 corresponds to KRL files 107 being managed by the rule repository application 125.

Communication 129 between the KRL Parser 109, the rule repository application 125, and the application management API 130 provides these services, at specific points in their operation, an opportunity to validate the syntax of the Kynetx™ rule language (KRL) contained in KRL files 107 transiting through to other points in the system 70. The parser 109 responds, indicating whether the KRL syntax is correctly formed. Meanwhile, the application management API 130 provides an interface for external applications to interact with the rule repository application 125 to create, store, and edit KRL files 107.

The use of the application management API 130 is authorized using OAuth 131. Applications using the application management API 130 must be authorized, through their account 137 with a consumer token generated using OAuth token production 138.

The application builder 132, or app builder 132, is the application development tool provided by the Kynetx™ system 70. Users log in and obtain authorization of their use of appbuilder 132 using OAuth 133. Users of appbuilder 132 must have a Kynetx™ account 137 and authorize the use of appbuilder 132 using Oauth 133.

Similarly, ruby gem 134 encapsulates the functionality offered by the app management API 130 in a way that simplifies for developers of KRL management apps 135 the task of integrating connectivity to the Kynetx™ system 70 into any arbitrary, proprietary, development or management tool. The developer typically must provide an OAuth consumer token for Oauth 1331 to grant access to the app management API 130 for that developer's KRL management application 135.

A KRL management app 135 (using Ruby Gem) is a proprietary application developed by a third party, independent from the system 70, for the purpose of managing specific products, services, or applications deployed on the Kynetx™ platform 70. KRL management apps 136 (using the App Management API 130) apply in cases where developers of KRL management apps 136 do not wish to use the Ruby Gem 130. Developers can invoke the app management API 130 directly in their KRL management applications 136. The application 136 serves basically the same purpose as the application 135, but the method of access changes.

The accounts application 137 allows users to create accounts, manage user information, and manage access to different resources. Kynetx™ provides a global accounts system 137 used across the Kynetx™ system 70, relying on OAuth token production 138 to generate OAuth consumer tokens on behalf of users. These tokens are used in authorizing access to use system 70 components. The accounts application 139 stores account data in a relational or other database 139.

Communication 140 between the KRE 105 and various Kynetx™ sources (KPDS and PDX), facilitates use by the KRE 105 of data from various sources in the evaluation of KRL files 107. For data sets not integrated natively into KRL other data services may allow the KRL developer to use external data sources. The KRE 105 and KRL provide facilities to name data sources within a KRL file 107. Sometimes those data sources will be fronted by a Kynetx-provided service such as a Kynetx™ personal data store 142 (KPDS 142) or personal data exchange 143 (PDX 143). This communication layer can use OAuth to authorize the use of data.

A layer 141 of authorization to access data elements may form an important part of the Kynetx™ data access layers. The system embodiment illustrated relies on an OAuth module 141, a user managed access (UMA) module 141 or UMA-like services to allow users to control the access of their data by Kynetx™ applications. Such emerging technologies allow a user to control access by others to specific data elements related to that user. The KPDS technology allows developers to connect to local data 145 and non-PDX data 149. Similarly, the PDX 143 lets people store data in PDSs 142 controlled by themselves. A PDX provides the standards and protocols for the exchange of data in a PDS 142.

Communication 144 between a local data store 145 and a KPDS 142 may rely on a relational or other database 145 for storing data that cannot be obtained from any other source. The KPDS 142 may connect to the database 145 through normal RDBMS (Relational Database Management System) connectivity technologies. Thus, the database 145 may be used by KPDS 142 for storing local data. Communication 146 between KPDS 142 and data shims 147 may provide access to, and communications 148 with, non-standard or non-PDX data sources 149.

These shims 147 translate the source data API from its existing standard to REST (representational state transfer) a standard for web services. Thus a shim 147 may be thought of as a custom program providing a translation layer between a data source 149 and REST. The communication 148 between shims 147 and data sources 149 is accomplished using the native technology implemented in the Non-PDX data source 149 itself. In these cases of non-PDX data 149 the Kynetx™ system 70 or platform 70 benefits from accepting data from as many sources 149 as possible. Data non-conformal to REST or PDX standards can thus still be used in Kynetx™ applications 107.

Communication 150 between Kynetx™ PDX facilities and PDX data sources 151 typically takes place using PDX standards, including OAuth 141 and UMA 141 or technical equivalents 141. PDX data 151 may be contained in PDSs across the Internet.

An application marketplace module 152 provides a location and manner whereby developers can sell and distribute their applications configured to work with the Kynetx™ system 70. Communication 153 between the marketplace module 152 and application meta data 154 refers to communication 153 with a data store 154 storing data about applications available. This data may be accessed through standard RDBMS access technologies. The marketplace module 154 may store application meta data 145 in a standard database 154 for display to application shoppers accessing the marketplace module 152.

Communication 155 between the accounts module 137 and account data 139 may rely on standard RDBMS access technology. Similarly, communication 156 between the Ruby Gem 134 and the application management API 130 may implements native application management API 130 calls over HTTPS (Hypertext Transfer Protocol Secure). Oauth 133, meanwhile, may authorize the KRL management applications 135 to manage applications.

Communication 157 between the KRL management application 136 and the management application API 130 may rely on HTTPS and use native application management API 130 calls, as authorized using Oauth 131. Similarly, communication 158 between the appbuilder module 132 and the application management API 130 may occur over HTTPS using native application management API 130 calls authorized using Oauth.

Communication 159 between the application management API 130 and the rule repository application 125 typically occurs using system-level access and native rule repository application 125 function calls. At the opposite side of the system 70, communication 160 between an endpoint 103 and the KRE 105 obtains salience data for installed participating applications 101 using KRE 105 APIs. Also, communication 161 between the controller 112 and the KRE 105 allow the controller to identify the endpoints 101 associated with the installed applications for a user.

Thus, KRL allows a developer to define every aspect of a KRL application 107 embedded in a KRL file 107. A properly formed KRL file 107 defines salience data for endpoints corresponding to participating applications 101, what events 104 it cares about. The KRL file defines code structures (e.g., global code blocks, accessible from any KRL file 107) and contains individual rules, selected based on event criteria defined for each specific rule.

Each specific rule contains a prelude block wherein a developer can place code snippets to be implemented in accordance with that rule, or in other words, defining conditions that are evaluated to determine whether action is to be taken. There exists a hierarchy for a Kynetx™ rule to "fire," trigger, or take action. An API call occurs. A dispatch block defines in broad terms what is salient for a participating application 101, as per a developer's decisions as to what matters.

Kynetx™ benefits from the largest set of salient events 104 possible to be defined and trackable. These events 104 depend on what a participating application 101 needs. Typical will events such as the occurrence of a web page view identification, a location on a page, conditions of the participating applications or hardware, and so forth. For example, a person (user) having a computer or phone turned on, being online, looking at a page of interest, or the like may be a salient event, significant to a participating application 101.

It is possible that the participating application 101 is not actively passing data but is simply being monitored. For example, the participating application 101 may have or may be software, but may instead simply be hardware with detectable conditions detectable and reportable by the endpoint 103. Even a mechanical device 101 may be interfaced with a processor enabled endpoint device 103 to monitor it.

A participating application 101 may thus be a "dumb" device such as a mechanical linkage fitted with a cpu-enabled endpoint 103 monitoring conditions thereof, or a lawn sprinkler relay having a voltage, current, or activity detectable by an endpoint 103 associated therewith. Such a participating application 101 is not only not Internet connectable or aware, but may have no processing capability at all.

Nevertheless, the system 70, via the endpoint 103 that is processor based and Internet connected, may read or otherwise detect conditions and assert actions controlling that participating application. Thus the above characteristics and events may be detected, controlled or both, through the endpoint 103. Therefore, such control may be asserted based on events 104 such as weather data, time, periodicity, humidity, or anything else pertinent to operation of that participating application 101.

In another example, a participating application 101 may be a very sophisticated cell phone or personal digital assistant having Internet access. Salient events 104 may include Internet page visits by the user who owns the participating application. Salient events may also be the user's physical location, such as latitude and longitude, along with data about the location of a brick and mortar business location who hosted the web pages previously accessed by that user. Such data may be read from computer data, user volunteered data relating to user desires, and from the mobile device, active, on, and corresponding to the participating application 101 associated with a user having some of the foregoing data applicable thereto.

In this latter example, a store, restaurant, movie theater, or like establishment may broadcast to a user a message, email, call, or like communication, upon the user coming within a certain proximity of that establishment. The communication may notify that user of the availability of something the user was recently searching for or reading about on a desktop, laptop, cell phone, or other computing device on the Internet. The communication may provide coupons, discounts, sale information, establishment name, directions, even an aisle number and price for the item of interest. All this may be with the permission or request of the user, provided previously. Thus, a commercial marketplace becomes even more fluid, and a person may rely on the KRE computer system 70 to watch for deals on goods and services at or below a desired price, in or around a certain geography, reported when they become available under the right conditions.

In general, the end point 101 knows what is salient for its participating application 101, as told to it by the KRE 105. The participating application 101 simply reports data to the endpoint 103 or is monitored by the end point 103, which collects whatever data the endpoint is programmed and connected to collect. The end point 103 then passes on the salient data to the KRE 105 as described above.

Conditions are more likely to be value related. These may be scientific data values, geographic values, commercial values, proximity values, any detectable state or condition values, demographic values, industrial or process values, and so forth. A select statement (salient T/F) may rely on a state machine used to track input of salience data. For example, a rule may instruct to select when A=x, B=y, C#w, D#v, OR some condition, Before a condition, After a condition, Between two conditions, AND including another condition, and so forth.

If the conditions exists, then some response may be reported, selected, or the like. Conditions are typically true or false (T/F). An list of conditions may be relied upon, like check data and operate as per values, logic, and so forth. Thus, detection of facts, data, or the like related to external events like weather, detection of personal conditions of a user such as location, health, status, inputs, etc., detection of conditions of a participating application such as on, off, hot, dry, up, down, moving, stopped, location, etc., or any or all of the above, may inform the decision by the KRE 105 to trigger an instruction activating a functionality of the participating application 101 (e.g., car, sprinkler, linkage, Iphone™, radio, printer, computer, signal, light, etc.).

The way select statements deal with salience from endpoints communicating with participating applications 101 is unique. The fact that one can define in a block of code the salience of events occurring at the participating application 101, and detected by the endpoint 103 provides unique capability to upgrade legacy devices (participating applications 101) virtually independently of any previous capacity or complete lack of capacity to communicate or process information. Likewise, automated control based on virtually any parameter organic to the device 101, the owner thereof, the desires of the owner, the weather or external factors, etc. may be used to control the device 101.

Within a KRL file 107, a block of code called the dispatch block is a filter above the select statement. Thus, the KRE may know that a user cares about target.com. The KRL file application 107 will operate on target.com. So, within each layer, the select statement gets more specific, conditions are more specific. The parser 109 is a syntax checker. The state of the state engine is set by the conditions required. Once the conditions achieve a completed state, the KRE 105 permits instructions 102 to go to end point 103 to control or otherwise communicate with the participating application 101.

In operation, the rule engine 105 may rely on "select statements" contained within each rule within a KRL file 107. These define the criteria that must be met in order for the contents of the rule to be evaluated further, or "selected." Criteria may be established by a developer to be anything cognizable by a computer such as a word, a value, a string, a recognizable image, or the like. However, criteria may typically be set to be at the top of a decision hierarchy to determine whether to invoke evaluations, rather than to contribute information to them. Note that Conditions, explained below are typically lower and more detailed in the decision hierarchy of the system 70.

The rule engine 105 may also use a prelude block, a block of code that resides within an individual rule in a KRL file 107. This prelude block is used to define code elements that will be used in the rest of the rule.

Conditions are statements within the rule that are evaluated after the rule has been selected. Conditions may include evaluations of external data sources 76, either native to the platform and to KRL, or non-native and accessed through the data access system. Conditions may be created from anything identifiable, such as values of parameters, text, words, images or other identifiable and communicable information. For example, weather data such as moisture, temperature, and wind may be monitored and reported, as may light and darkness to make a difference in some decision. Conditions of machines, facts, data, locations, people, positions, and so forth may be detectable and communicated as conditions.

Actions are taken after a rule is selected and all of the conditions evaluated are met or true. Then the rule engine 105 encapsulates instructions in a directive (e.g., instruction, data, or both) sent back to the endpoint 103 in the form actions. Actions may be communicated, for example, by data (e.g., executable instructions, parameters, other data structures, etc.) corresponding to actions to be taken by the endpoint. These actions typically may involve asserting some type of control over the participating application 101 corresponding to the endpoint 103.

Callbacks are data structures built into the actions to report information back to the rule engine 105, based on the action by the end point, participating application, user operating or responsible for the participating application, or the like. For example, certain actions may be taken by a device or by a user after receiving resulting data or functionality reflecting operation of the participating application. Thus, callbacks provide feedback from the rule engine and endpoint.

In a typical process, an endpoint 103 observes the occurrence of a salient event relating to a participating application 101. The endpoint 103 generates a request to the rule engine 105, comprised of the identifier for a corresponding KRL file needed, as well as the salient data and any other information pertinent to that particular endpoint 103 type.

The endpoint 103 sends the request to the rule engine 105 over the Internet. After the rule engine 105 receives the request, it pulls the KRL file 107 either from a cached location or from the rule management application system 74. The rule engine 105 sends the KRL file 107 to the KRL parser 109 to ensure that it is properly formed. The KRL parser 109 parses the KRL file 107 and returns a true or false result to the rule engine 105. True means the KRL file 107 has proper syntax, is properly formed, and a false return means it is not.

The rule engine 105 next sets up a state machine 110 for each rule contained in the KRL file 107, using the information contained in the KRL file 107 in the select statement. The rule engine 105 creates a server session with state storage for the particular participating application 101 involved, with the particular user, associated therewith, or both.

The rule engine 105 evaluates the request from the endpoint 103 and compares the steps defined in the state machine 110 to the data sent from the endpoint 103. If a criterion or a plurality of criteria defined by the state machine 110 are met by the data sent from the end point 103, then the rule engine 105 writes out the new state for the user and endpoint 103 in the server session that was created, as discussed above.

Once all criteria for a state machine 110 for a particular rule are met, the rule engine 105 continues with the evaluation of the rest of the rule. The rule engine 105 evaluates the conditions defined in the rule and accesses any data required. Once all of the conditions have evaluated to true then the rule engine 105 generates a directive 111 with the actions specified for the participating application 101.

The rule engine 105 transmits the directive 111 back to the endpoint 103, which takes appropriate action, in accordance therewith, to pass the action instructions back to the participating application 101 in the native protocol of the participating application 101, whatever that may be. There need be no inherent limits on the protocol, so long as an endpoint 103 is configured physically to monitor and operate the participating application 101.

The participating application 101 receives or otherwise consumes the instructions and effects the defined behavior or functionality corresponding thereto. A physical actuation of a component may occur, information may pass, a switch may be triggered, or any other of a nearly endless varieties of action may occur. This is because the endpoint 103 is configured to interact in the specific way (protocol) required by the participating application 101.

A user may react to the defined behavior. If a user takes an action that has an attached callback, then the endpoint 103 transmits the callback back to the rule engine 105.

Typically, each time the rule engine 105 transmits directives 111 to the endpoint 103, the rule engine 105 records in a log file 120 all pertinent information about those workings and transactions.

The application management system 74 in the Kynetx™ system 70 or platform 70 provides a variety of unique functions. The application management system 74 provides an abstract mechanism or a level of abstraction, one could even call it a level of indirection, for developers of systems that use the Kynetx™ platform 70 to manage KRL files 107.

Initially, the application management system 74, through its components provides two mechanism for file management, direct API 130 access and a Ruby gem 134. A client application can invoke either of these methods to write out new KRL files 107 or manage existing files 107. One result of this functionality is the capability for third parties to develop applications that use the Kynetx™ platform 70 while maintaining a level of abstraction for their own users.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A computer executed method for controlling a participating application comprising:
   providing an endpoint module configured to communicate via a communications network;
   providing a data system for receiving data from the endpoint module via the communications network;
   providing a rule engine that includes a set of rules by which the rule engine evaluates requests received thereby;
   identifying a participating application configured to communicate via a participating protocol;
   operably connecting the endpoint module to the participating application for communication using the participating protocol;
   operably connecting the rule engine to the endpoint module;
   reporting, by the endpoint module, the occurrence of an event to the rule engine;
   receiving, via the rule engine, the reporting of the occurrence of the event from the endpoint module containing data reflecting the at least one event, selected data selected out of the general data by the data system in accordance with instructions from the rule engine, and evaluation instructions for controlling operation of the rule engine;
   receiving, by the rule engine, from the data system, at least one data item providing a historical state associated with the participating application;
   evaluating, by the rule engine, the event in the context of the historical state of the participating application using the set of rules;
   generating directives, by the rule engine, based on the evaluation of the event corresponding to actions to be executed by the participating application;

instructing, by the rule engine, the endpoint module to invoke the functionality of the participating application; and controlling, by the end point module, in the participating protocol, the participating application.

2. The method of claim 1, further comprising receiving, by the rule engine, callback data from the endpoint module, the callback data corresponding to secondary events, the secondary events being defined by a rule language file and corresponding to actions taken by an entity associated with the participating application.

3. The method of claim 1, further comprising receiving from a developer, independent from the rule engine and from the end point, a rule language file comprising executable instructions and operational data effective to control operation of the rule engine in directing the end point to do at least one of controlling and monitoring the participating application.

4. The method of claim 3, further comprising extracting from the rule language file at least two of an evaluation of the syntax thereof with respect to the rule language, salience data for an endpoint and corresponding to the participating application, and an individual rule based on event criteria defined for the participating application.

5. The method of claim 4, wherein the individual rule comprises a prelude block containing executable code from the developer to be implemented by the rule engine in accordance with the individual rule.

6. The method of claim 5, wherein the rule language file further comprises conditions to be evaluated by the rule engine to determine whether a required action is to be taken.

7. The method of claim 1, wherein the set of rules comprises a dispatch block defining at least one event corresponding to the participating application.

8. The method of claim 7, wherein the event is selected from a web page view identification, a location on a web page, a condition of the participating application, the state of a computing device being on, the state of a telephonic device being on, the condition of a user computer being logged on to the Internet, a mobile device corresponding to a user being located within a pre-determined distance of a location, and a value of data corresponding to a user.

9. The method of claim 8, further comprising receiving, by the endpoint module, salience data from the rule engine identifying events corresponding to the participating application.

10. The method of claim 9, further comprising evaluating, by the rule engine, upon detection of the occurrence of the salience data, condition data reflecting a plurality of conditions, each condition thereof being selected from a value of a parameter reflecting at least one of scientific data, geographic data, commercial data, a distance, a proximity, a detectable state of a device corresponding to the participating application, demographic data, industrial data, and process data.

11. The method of claim 10, further comprising selecting, by the rule engine, select statements corresponding to the events, prior to the evaluating the condition data, and based on the pertinence thereof as reflected in the salience data, the select statements corresponding to the endpoints communicating with the participating application.

12. The method of claim 11, further comprising installing, with the endpoint module a sensor monitoring the participating application, and installing an actuator, connected to actuate the participating application and controlled by the end point, in accordance with the rule file.

13. The method of claim 12, wherein the condition data reflects data not known to the participating application nor determinable therefrom.

14. A system for controlling a participating application based on facts corresponding to an entity associated with the participating application, the system comprising:

an endpoint comprising an endpoint processor configured to:
communicate with a participating application associated with an entity using a protocol associated with the participating application; and
communicate via a communications network using a domain specific language with a remote server;

a rule engine stored in memory configured to receive requests via the communications network using the domain specific language from the endpoint, wherein the rules engine is configured to evaluate requests according to a set of rules in the context of historical state data associated with at least one of the endpoint and the associated participating application;

the rule processor, further programmed to define conditions relating to control of the participating application and based on facts corresponding to the entity controlling the participating application, identify from the rule language file, salient events, communicate to the end point, the salient events, wherein the endpoint is configured to receive report data from the participating application, the report data including at least one salient event, wherein the endpoint is configured to transmit the report data via the communications network to the rules engine, wherein the rules engine is configured to evaluate the report data in the context of at least one of state data associated with the participating application and historical report data, and wherein the rules engine is further configured to:
generate directives corresponding to actions to be executed by the participating application based on the report data and the at least one of state data associated with the participating application and historical report data, and
instruct the endpoint to invoke the functionality of the participating application by sending the directives to the end point processor, and
control in the native protocol thereof, the participating application.

15. The system of claim 14, wherein the participating application is not Internet enabled.

16. The system of claim 14, wherein the salient event corresponds to data detected by the participating application.

* * * * *